US008131283B1

(12) United States Patent
Vargantwar et al.

(10) Patent No.: US 8,131,283 B1
(45) Date of Patent: Mar. 6, 2012

(54) CONTROLLING MOBILE DEVICE ROAMING IN ASSOCIATION WITH MONITORING AN ACTIVE EVENT DURATION

(75) Inventors: Sachin R. Vargantwar, Overland Park, KS (US); Manoj Shetty, Overland Park, KS (US); Bhagwan Singh Khanka, Lenexa, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 419 days.

(21) Appl. No.: 12/394,252

(22) Filed: Feb. 27, 2009

(51) Int. Cl.
*H04M 3/00* (2006.01)

(52) U.S. Cl. .................. 455/419; 455/432.1; 455/435.2; 455/433; 455/434; 455/455; 370/311; 370/328

(58) Field of Classification Search ............... 455/432.1, 455/433, 422.1, 419, 434, 455; 370/311, 370/328
See application file for complete search history.

(56) References Cited

U.S. PATENT DOCUMENTS

| | | | |
|---|---|---|---|
| 6,085,087 A | 7/2000 | Hori et al. | |
| 6,516,194 B2 * | 2/2003 | Hanson | 455/433 |
| 6,600,922 B1 * | 7/2003 | Aoki | 455/432.1 |
| 6,766,169 B2 * | 7/2004 | Cooper | 455/435.2 |
| 6,957,068 B2 * | 10/2005 | Hutchison et al. | 455/435.2 |
| 7,079,849 B2 | 7/2006 | Hanson | |
| 7,149,229 B1 * | 12/2006 | Leung | 370/466 |
| 7,167,707 B1 * | 1/2007 | Gazzard et al. | 455/434 |
| 7,245,913 B1 | 7/2007 | Nguyen | |
| 7,706,793 B2 * | 4/2010 | Zhang | 455/435.2 |
| 7,764,968 B2 * | 7/2010 | Ahopelto et al. | 455/450 |
| 7,937,083 B2 * | 5/2011 | Oommen | 455/432.3 |
| 7,962,135 B2 * | 6/2011 | Cooper | 455/432.1 |
| 2004/0109436 A1 * | 6/2004 | Vargas et al. | 370/350 |
| 2006/0079224 A1 * | 4/2006 | Welnick et al. | 455/432.1 |
| 2006/0079225 A1 | 4/2006 | Wolfman | |
| 2006/0172733 A1 * | 8/2006 | Benco et al. | 455/433 |
| 2008/0062922 A1 * | 3/2008 | Qi | 370/331 |
| 2008/0170525 A1 * | 7/2008 | Geiger | 370/311 |
| 2009/0061863 A1 * | 3/2009 | Huggett et al. | 455/434 |
| 2010/0042691 A1 * | 2/2010 | Maguire | 709/206 |
| 2010/0075669 A1 * | 3/2010 | Sparks et al. | 455/433 |

OTHER PUBLICATIONS

First Action Interview Pilot Program, m. Aug. 19, 2011, U.S. Appl. No. 12/394,348, 15 pp.

* cited by examiner

*Primary Examiner* — Kamran Afshar
*Assistant Examiner* — Mong-Thuy Tran (57) ABSTRACT

Systems, methods, and computer-readable media for controlling roaming of a mobile device when the mobile device is in an active mode while utilizing a roaming network. A duration of an active event for which the mobile phone utilizes the roaming network is referenced. It is determined whether the duration of the active event exceeds an event threshold. The event threshold indicates a maximum amount of time the mobile device is allowed to connect to the roaming network in association with the active event. In instances that the duration of the active event exceeds the event threshold, the mobile device is transferred from the roaming network to a home network of the mobile device.

15 Claims, 5 Drawing Sheets

CONTROLLING MOBILE DEVICE ROAMING IN ASSOCIATION WITH MONITORING AN ACTIVE EVENT DURATION

SUMMARY

Embodiments of the invention are defined by the claims below, not this summary. A high-level overview of various aspects of the invention is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, one or more computer-readable media having computer-executable instructions embodied thereon that, when executed, perform a method for controlling roaming of a mobile device when the mobile device is in an active mode while utilizing a roaming network. The method includes referencing a duration of an active event for which the mobile phone is utilizing the roaming network. The duration of the active event is determined to exceed an event threshold that indicates a maximum amount of time the mobile device is allowed to connect to the roaming network. In accordance with the determination that the duration of the active event exceeds the event threshold, the mobile device is transferred from the roaming network to a home network of the mobile device.

In a second aspect, a computer-implemented system for performing a method for controlling roaming of a mobile device when the mobile device is in an active mode while utilizing a roaming network is illustrated. The system includes a threshold determining component that determines that a time duration of an active event for which the mobile phone utilizes the roaming network exceeds an event threshold that indicates a maximum amount of time the mobile device is allowed to connect to the roaming network in association with the active event. The system also includes a network transferring component that initiates a transfer of the mobile device from the roaming network to a home network.

In a third aspect, a computer-implemented method for controlling roaming of a mobile device when the mobile device is in an active mode while utilizing a roaming network is provided. An active phone call utilizing the roaming network is monitored to obtain a current time duration of the active phone call. An event threshold associated with the active phone call is referenced. It is determined that the current time duration of the active phone call exceeds the event threshold. In accordance with the determination that the current time duration of the active phone call exceeds the event threshold, the active phone call is disconnected from the roaming network and a device setting of the mobile device is changed so that the mobile device connects to a home network of the mobile device.

BRIEF DESCRIPTION OF THE SEVERAL VIEWS OF THE DRAWING

Illustrative embodiments of the present invention are described in detail below with reference to the attached drawing figures, and wherein.

DETAILED DESCRIPTION OF THE INVENTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| 3G | Third Generation |
| 4G | Fourth Generation |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GPRS | General Packet Radio Service |
| GSM | Global System for Mobile communications |
| iDEN | Integrated Digital Enhanced Network |
| PCS | Personal Communications Service |
| PDA | Personal Digital Assistant |
| PMP | Portable Media Player |
| RAM | Random Access Memory |
| ROM | Read Only Memory |
| TDMA | Time Division Multiple Access |
| UMTS | Universal Mobile Telecommunications System |
| Wi-Fi | Wireless Fidelity |
| WiMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information.

Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for controlling mobile device roaming in association with active event duration. That is, by monitoring the length of one or more active events, the amount of time a mobile device is permitted to roam can be reduced. Mobile device roaming refers to a mobile device utilizing a roaming network to obtain services, such as voice services (e.g., enable a mobile device to make and/or receive voice calls) and/or data services (e.g., enable a mobile device to send and/or receive data). As such, a mobile device that is roaming uses a roaming network rather than a home network to communicate with another computing device, such as a mobile device, a server, a personal computer, or the like. An active event refers to an event being actively (e.g., currently or presently) performed via a mobile device. An event might be any event that utilizes services, such as voice services or data services, provided by a wireless telecommunications network. Accordingly, in one embodiment, an active event is a telephone call occurring on a mobile device.

Generally, a mobile device within a coverage area of a home network utilizes the home network to obtain services. That is, in instances where a mobile device is within a coverage area of a home network, the home network generally provides services to the mobile device. In some cases, however, the mobile device might utilize services of a roaming network even though the home network is capable of providing services to the mobile device. For instance, assume that a mobile device initiates a phone call utilizing a roaming network because the home network is unavailable (e.g., the mobile device is outside the geographical coverage area of the home network). Assume that, upon origination of the phone call, the mobile device is transferred to another location that is capable of receiving services from both the roaming network and the home network. In such a case, embodiments of the present invention enable the mobile device to transfer (e.g., initiate a handoff) from the roaming network to the home network and, thereby, reduce mobile device roaming. As such, rather than maintaining usage of the roaming network until termination of the phone call even though services can be provided by the home network, the mobile device can begin using the home network during the phone call to reduce or limit time (e.g., minutes of use) or costs (e.g., costs to the mobile device user or costs to the service provider of the home network) associated with utilizing the roaming network.

Figure 1:
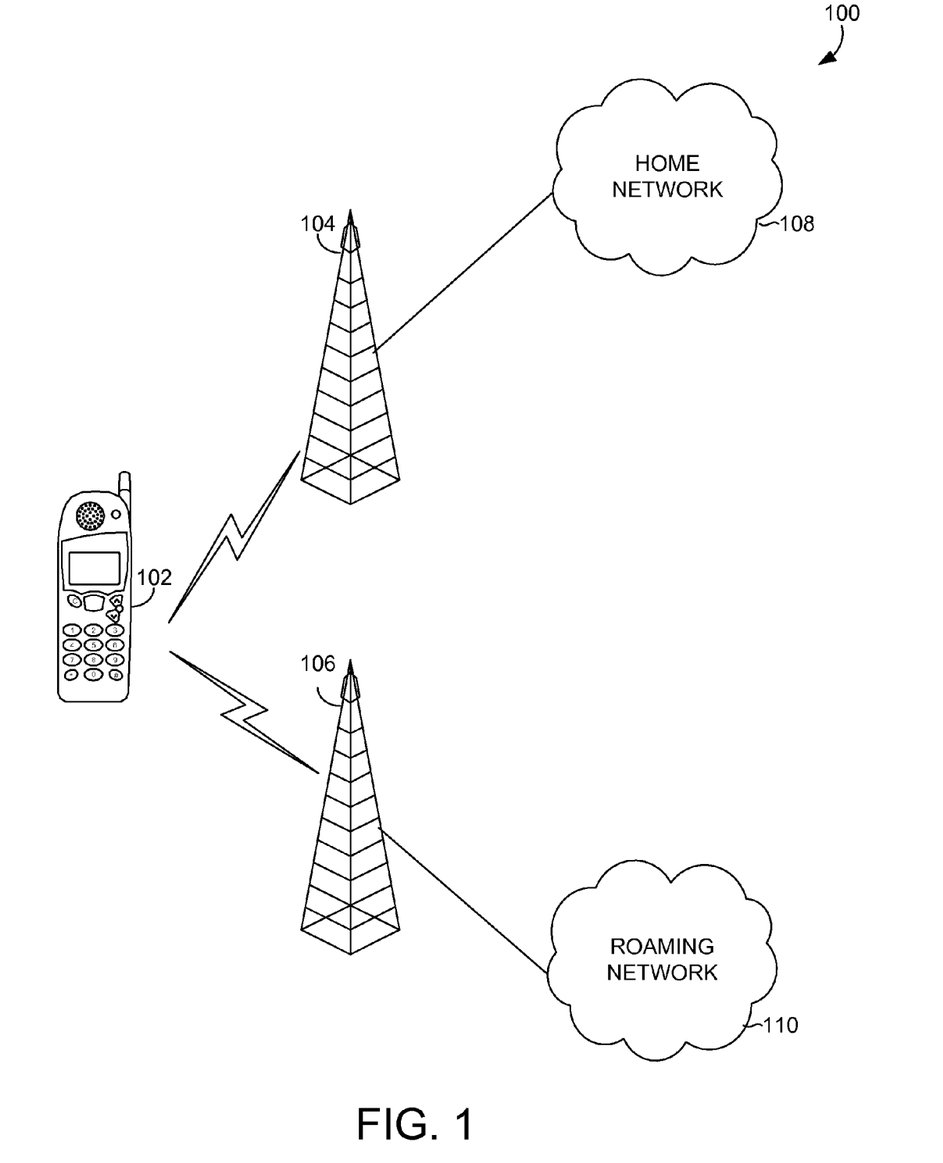
FIG. 1 is an exemplary network environment for practicing an embodiment of the present invention.

Referring to the drawings generally, and initially to FIG. 1 in particular, an exemplary network environment for practicing an embodiment of the present invention is provided and designated generally by numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. As shown in FIG. 1, an exemplary network environment 100 includes a mobile device 102 that can communicate with another computing device (not shown), such as, for example, a mobile device, a personal computer, a server, etc. The mobile device 102 of FIG. 1 can be any mobile computing device that communicates by way of a wireless network (e.g., a wireless telecommunications network). As such, the mobile device 102 may take on a variety of forms, such as a laptop computer, a mobile phone, a personal digital assistant (PDA), a portable media player (PMP), or any other mobile device that is capable of communicating via a wireless network. Makers of illustrative mobile devices include, for example, Research in Motion®, Creative Technologies Corp., Samsung®, Apple® Computer, and the like. A mobile device can include, for example, a display(s), a power source (s) (e.g., a battery), a data store(s), a speaker(s), memory, a buffer(s), and the like.

The mobile device 102 communicates by way of a wireless transceiver, such as wireless transceiver 104 and/or wireless transceiver 106. A wireless transceiver serves as a transceiver for wireless communications between the mobile device 102 and a network, such as a home network 108 and/or a roaming network 110. Examples of wireless transceivers include, but are not limited to, a base station transceiver and a Node B. Additional examples of wireless transceivers include Wi-Fi and WiMAX compatible transceivers. In embodiments, wireless transceivers 104 and/or 106 are considered a component of a corresponding wireless telecommunications network with which the mobile device 102 communicates. As such, wireless transceiver 104 might be a component of the home network 108, and wireless transceiver 106 might be a component of the roaming network 110.

The mobile device 102 communicates with other computing devices (e.g., a mobile device(s), a server(s), a personal computer(s), etc.) utilizing a network, such as the home network 108 and/or the roaming network 110. In embodiments, each of home network 108 and/or roaming network 110 are a wireless telecommunications network. A wireless telecommunications network refers to any type of telecommunications network that is wireless. Examples of a wireless telecommunications technologies that might be compatible with the home network 108 and/or the roaming network 110 include, but are not limited to Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices or components, which are not shown so as to not obscure more relevant aspects of the invention. Components such as a base station, a communications tower, or even access points (as well as other components) can provide wireless connectivity in some embodiments. Home network 108 and/or roaming network 110 can include multiple networks, as well as being a network or networks, but is shown in more simple form so as to not obscure other aspects of the present invention.

The home network 108 is a wireless telecommunications network associated with a wireless telecommunications provider that provides services to the mobile device 102. In this regard, a home network is generally used to provide services to a mobile device when the mobile device is within the coverage area of the home network. Such services might include voice services that enable making and receiving voice calls, data services that enable sending and receiving data, or other services provided by a wireless telecommunications provider. In embodiments, a mobile device user enters into a contract with a wireless telecommunication provider in connection with a home network to obtain wireless services.

Accordingly, the mobile device, or user associated therewith, might be registered with the wireless telecommunications provider, or home network associated therewith, to receive wireless services. That is, a home network describes a wireless telecommunications network to which a user is subscribed for wireless telecommunications services and is not intended to imply any relation to a user's home or dwelling.

The roaming network 110 is a wireless telecommunications network other than a home network of the mobile device that can provide services to the mobile device. A roaming network can be any wireless telecommunications network that a mobile device can establish a connection with other than the home network. Generally, a roaming network can provide services (e.g., voice services and/or data services) to a mobile device when the mobile device is outside geographical coverage of a home network of the mobile device. In embodiments, a wireless telecommunication provider in association with a home network contracts (e.g., via a roaming agreement) with a wireless telecommunications provider in association with a roaming network such that a mobile device can utilize a roaming network to obtain services, for example, in instances that the mobile device is outside of coverage of the home network. In such an embodiment, the mobile device, or mobile device user, might not be registered with the roaming network or the wireless telecommunications provider thereof.

The mobile device 102 might be located in an area (e.g., geographical area) such that it can receive services from the home network 108, the roaming network 110, or a combination thereof. By way of example only, a mobile device located at a first location within a coverage area of a home network might receive services from the home network. Assume that the mobile device is transferred to a second location within a coverage area of a roaming network. At the second location, the mobile device might be out of the area of services that can be provided by the home network and, as such, the mobile device might receive services using the roaming network. Assume now that the mobile device is transferred to a third location within an area of which services can be provided by both a home network and a roaming network. Generally, if the mobile device is within a coverage area of the home network, the home network will provide services to the mobile device. As previously discussed, in some cases, however, the mobile device might utilize services of a roaming network even though the home network is capable of providing services to the mobile device. For instance, assume that a mobile device places a phone call utilizing a roaming network because the home network is unavailable (e.g., the mobile device is outside the geographical coverage area of the home network). Assume that while on an active phone call the mobile device is transferred to another location that is capable of receiving services from both the roaming network and the home network. In such a case, embodiments of the present invention enable the mobile device to transfer from the roaming network to the home network and, thereby, reduce mobile device roaming. As such, rather than maintaining usage of the roaming network until termination of the phone call, the mobile device can begin using the home network during the phone call to reduce or limit time and/or costs associated with utilizing the roaming network.

Figure 2:
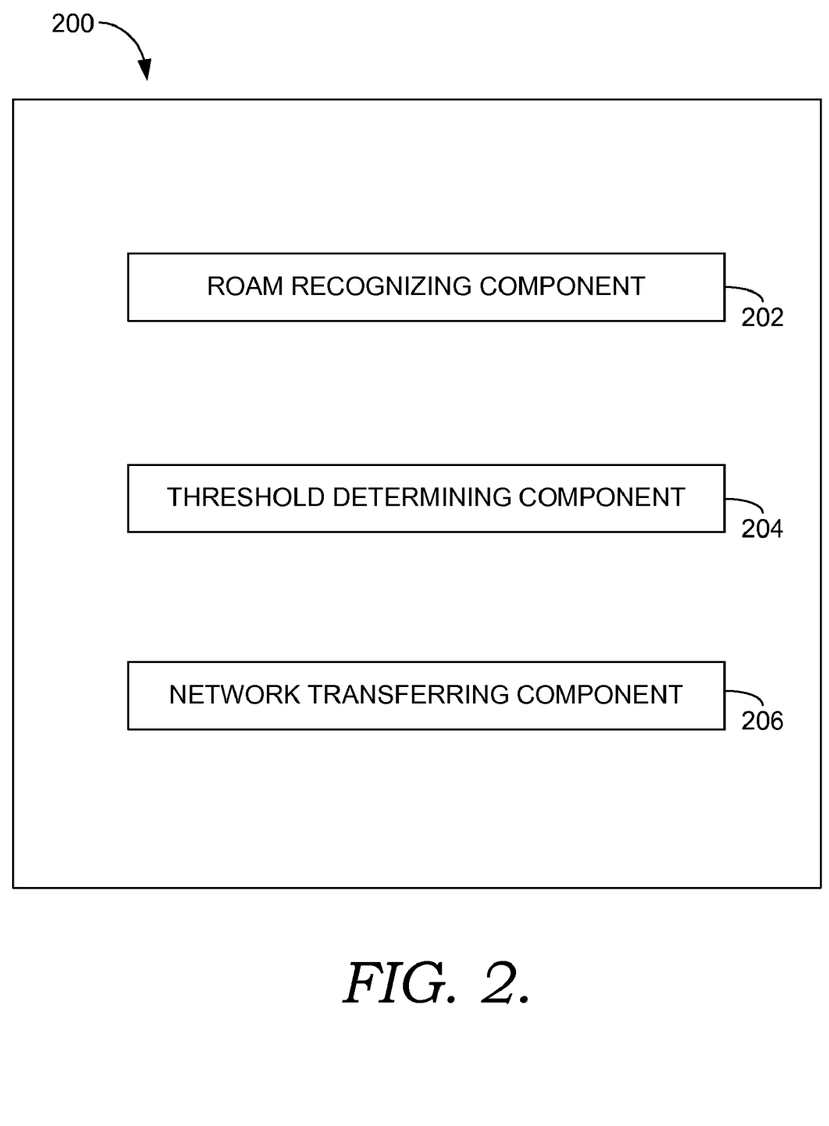
FIG. 2 is a block diagram of an exemplary system for controlling roaming of a mobile device, in accordance with an embodiment of the present invention.

With reference to FIG. 2, an exemplary computer system 200 for controlling mobile device roaming is illustrated. Exemplary computing system 200 may include a roam recognizing component 202, a threshold determining component 204, and a network transferring component 206. In some embodiments, one or more of the illustrated components may be implemented as one or more stand-alone applications. In other embodiments, one or more of the illustrated components may be integrated directly into an operating system or an application of a mobile device and/or a server. It will be understood by those of ordinary skill in the art that the components illustrated in FIG. 2 are exemplary in nature and in number and should not be construed as limited. Any number of components may be employed to achieve the desired functionality within the scope of embodiments hereof.

The roam recognizing component 202 is configured to recognize, determine, or identify whether the mobile device is roaming (i.e., utilizing a roaming network) while the mobile device is in an active operation mode (i.e., an active mode). In some embodiments, the roam recognizing component 202 might recognize or identify whether the mobile device is roaming by monitoring a network(s) (e.g., home network and/or roaming network) being used or capable of being used by the mobile device. Accordingly, a mobile device might identify a network being currently utilized by the mobile device. Recognizing whether a mobile device is roaming might occur upon a lapse of a time (e.g., periodically), continuously, upon an occurrence of an event (e.g., a connection with a network, a change in connection with a network, an initiation of an active event, such as an active phone call), or the like.

A mobile device in an active mode is a mobile device that is actively (e.g., presently or currently) utilizing services, such as voice services or data services of a wireless telecommunications network. For example, a mobile device is in an active mode (i.e., an active mobile device) when the mobile device is used for an active event, such as an active phone call (e.g., an active communication between the mobile device and another mobile device). In some embodiments, the roam recognizing component 202, or another component, is configured to identify, recognize, or determine whether the mobile device is in an active mode or being used in association with an active event. In such a case, the mobile device or other computing device might identify a mode of operation currently being used by the device. For example, the mobile device might identify the whether the mobile device is operating in an active mode.

The threshold determining component 204 is configured to determine if an active event duration, or collection of active event durations, exceeds an event threshold. As such, the threshold determining component 204 might compare an active event duration(s) to an event threshold to determine whether the active event, or a collection thereof, exceeds an event threshold. In one embodiment, the mobile device might compare an active event duration of a roaming call to an event threshold continuously during the length of a roaming active event (e.g., an active phone call using a roaming network). Alternatively, the mobile device might compare an active event duration of a roaming call to an event threshold periodically or based upon an occurrence of an event. For example, a roaming mobile device on a call may compare an active event duration with an event threshold after five minute intervals.

An active event duration refers to a duration (e.g., an amount of time) of an active event, such as an active phone call. In embodiments, the threshold determining component 204 might time an active event, such as a roaming phone call, to create an active event duration. For example, the threshold determining component 204 might record a start time an active event is initiated or begins. An active event duration or a start time might be stored on the mobile device or on a server or other computing device associated with the home and/or roaming network. The active event duration for an active event (e.g., an active roaming call) may be combined with active event durations of a set of one or more previous events. By way of example, a duration of a currently occurring phone call might be summed or aggregated with durations of previous active phone calls that occurred within the same time frame, such as a day. Such an aggregated or total active event duration might be stored on the mobile device, on a server, or on another computing device associated with the home and/or roaming network.

An event threshold, as used herein, refers to a maximum or allowed amount of time a mobile device is allowed to connect to a network(s) other than the home network. That is, the mobile device may identify the maximum amount of time a mobile device is allowed to connect to networks other than the home network in association with one or more active events. The threshold determining component 204, or another component, might be configured to determine, reference, obtain, identify, or recognize an event threshold. In one embodiment, an event threshold for a set of one or more active events may be obtained from the mobile device wireless communications provider. In such an embodiment, a wireless communications provider might predetermine a threshold for the maximum duration for a single active event or a collection of active events. An event threshold may be determined using a variety of parameters. For example, an event threshold may vary based on a calling plan of a user, a user's primary geographic coverage area, or a cost of roaming as determined by roaming partnership agreements. A mobile device may retrieve the predetermined event threshold from the wireless provider via a server or other computing device associated with the home network. Such an event threshold may be stored on the mobile device or other computing device. An event threshold may apply to a set of roaming calls over a certain period. For example, a mobile device may determine that an event threshold allotted for roaming to a user is eight hours per billing cycle. Alternately, an event threshold may apply per roaming active event. For example, the mobile device may determine that an event threshold allotted for roaming per phone call might be sixty minutes.

As can be appreciated, the threshold determining component 204, in another embodiment, might be configured to determine if a duration a mobile phone utilizes a roaming network, or multiple networks, exceeds an event threshold. That is, rather than comparing a duration of an active event, such as a phone call, to an event threshold, the threshold determining component 204 might compare a duration that a mobile device is connected to or utilizes a roaming network to an event threshold that provides a permissible amount of time the mobile device is allowed to connected to a roaming network(s). In such a case, the mobile device might record a time that the mobile device acquired or connected with a roaming network. Thereafter, the mobile device might periodically, continuously, or based on an occurrence of an event, determine whether the duration or mobile device roaming exceeds an event threshold for which a mobile device is permitted to roam.

The network transferring component 206 is configured to transfer a mobile device, such as an active mobile device, from a roaming network to a home network. By way of example only, an active call utilizing a roaming network is discontinued, and a connection with a home network is acquired through a handoff. As can be appreciated, a hard handoff or a soft handoff can be utilized to transfer an active mobile device from one wireless telecommunications network (e.g., a roaming network) to another wireless telecommunications network (e.g., a home network).

In one embodiment, the mobile device disconnects a roaming active event if the active event duration exceeds an event threshold. That is, a mobile device might terminate a roaming call and disconnect from the roaming network. In instances where an active event duration does not exceed an event threshold, the mobile device remains connected to the roaming network until the event threshold is surpassed or exceeded.

Alternatively or additionally, if active event duration exceeds an event threshold, the network transferring component 206 might change a device setting of the mobile device. A device setting refers to a setting of the mobile device that indicates a preference of the mobile device to use a home network and/or a roaming network. A device setting might include, but is not limited to, a roam only setting, a home network only setting, or an automatic setting. In a roam only setting, a mobile device is required to seek and connect to a roaming network. That is, a mobile device is only permitted to utilize services of a roaming network. In a home network only setting, the mobile device is required to access the home network only and access to alternative networks is prohibited. As such, a mobile device is only allowed to utilize services of a home network. In an automatic setting, the mobile device searches for a home network by default. However, in instances when the home network is unavailable, the mobile device is allowed or enabled to search for and connect to an alternate network (i.e., a roaming network).

A device setting might be changed so that the mobile device can utilize services of a wireless telecommunications network. By way of example, assume that it is determined that a roaming mobile device is being used for a phone call more than a predetermined threshold duration. Further assume that the mobile device is set to use a roam only setting. In such a case, if an active event is disconnected, the mobile device will return to utilizing services of the roaming network based on the roam only setting even though a home network might be available for use.

In one embodiment, modifying a device setting of a mobile device involves changing the device setting on the mobile device using a roam only setting or an automatic setting to the home network only setting. In such an embodiment, the mobile device searches for the home network and, thereby, can transfer to the home network. In some cases, a device setting that was initially changed to a home network only setting after exceeding an event threshold might change its device setting to an automatic setting in instances when the home network is unavailable. This allows the mobile device to acquire an available roaming network when the home network is unavailable. In other embodiments, a device setting of a mobile device using a roam only setting might be modified to an automatic setting. As previously described, an automatic roaming setting enables the mobile device to first search for the home network. However, when the home network is unavailable, a mobile device on the automatic setting is allowed to search for an alternate network.

As such, in one embodiment, the network transferring component 206, or other component, might be configured to determine a device setting applied to a mobile device and/or a device setting of which to initiate or apply to the mobile device. As can be appreciated, a determination of a device setting might occur prior to identifying whether the mobile device is roaming and/or determining if a threshold is exceeded. That is, before recognizing if the mobile device is roaming or determining if a threshold is exceeded, it might be determined if the device setting of the mobile device is a roam only setting, a home network only setting, or an automatic setting. Accordingly, in some cases, if it is determined that the mobile device is utilizing, for example, a home network only setting, the mobile device might end the process.

Figure 3:
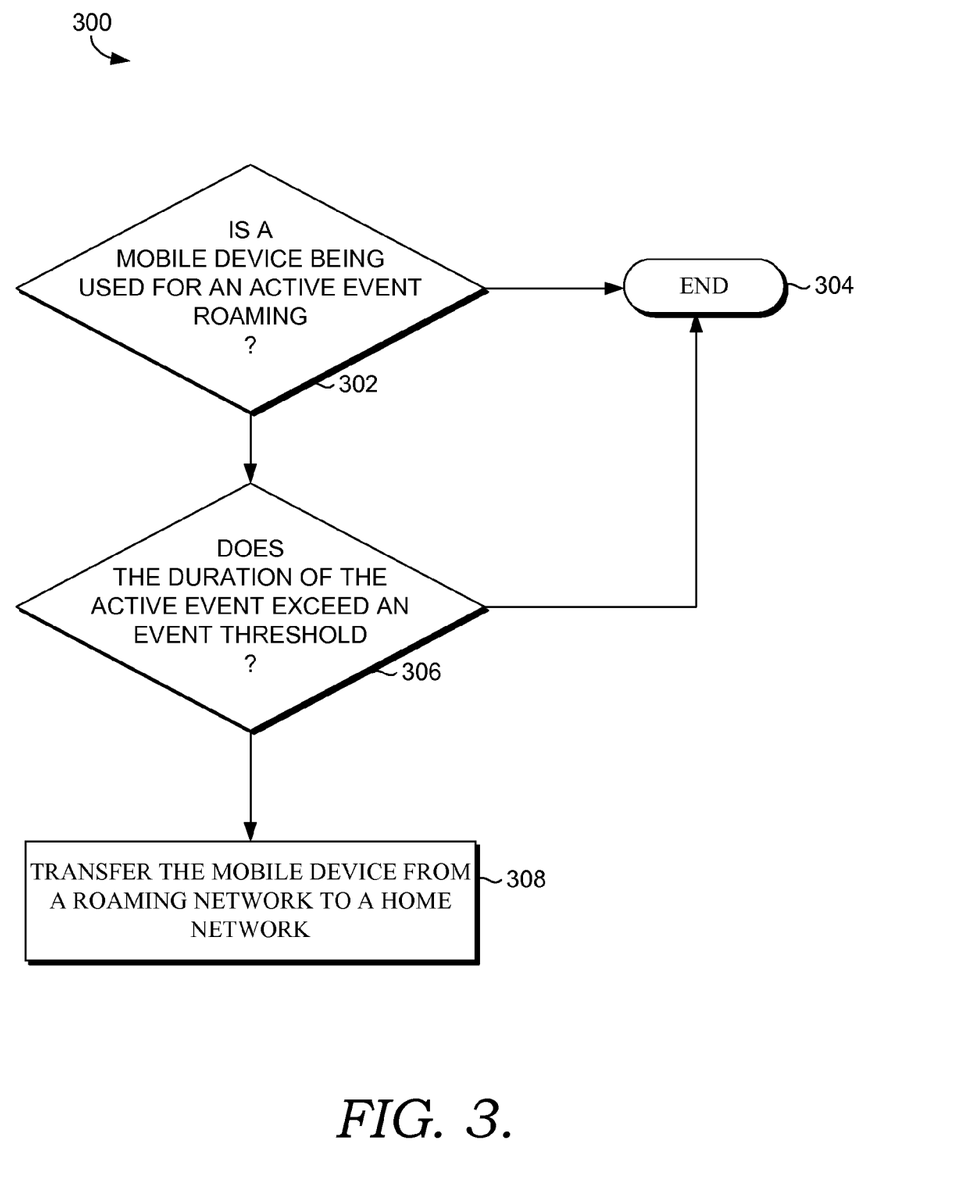
FIG. 3 is a flow diagram illustrating an exemplary method for controlling roaming of a mobile device associated with an active event duration, in accordance with an embodiment of the present invention.

With reference to FIG. 3, in accordance with an embodiment of the present invention, an exemplary method 300 for controlling roaming of a mobile device associated with an active event duration is illustrated. Initially, as indicated at step 302, it is determined whether the mobile device being used for an active event is roaming. In embodiments, the mobile device, or other computing device, might identify a network being used by the mobile device. If it is determined that the mobile device being used for an active event is not roaming, the method ends at step 304. If, however, it is determined that the mobile device being used for an active event is roaming, it is determined at step 306 whether the duration of the active event exceeds an event threshold. If it is determined that the duration of the active event does not exceed an event threshold, the method ends at step 304. If, on the other hand, it is determined that the duration of the of the active event exceeds an event threshold, the mobile device is transferred from a roaming network to a home network such that the home network can provide services to the mobile device.

Figure 4:
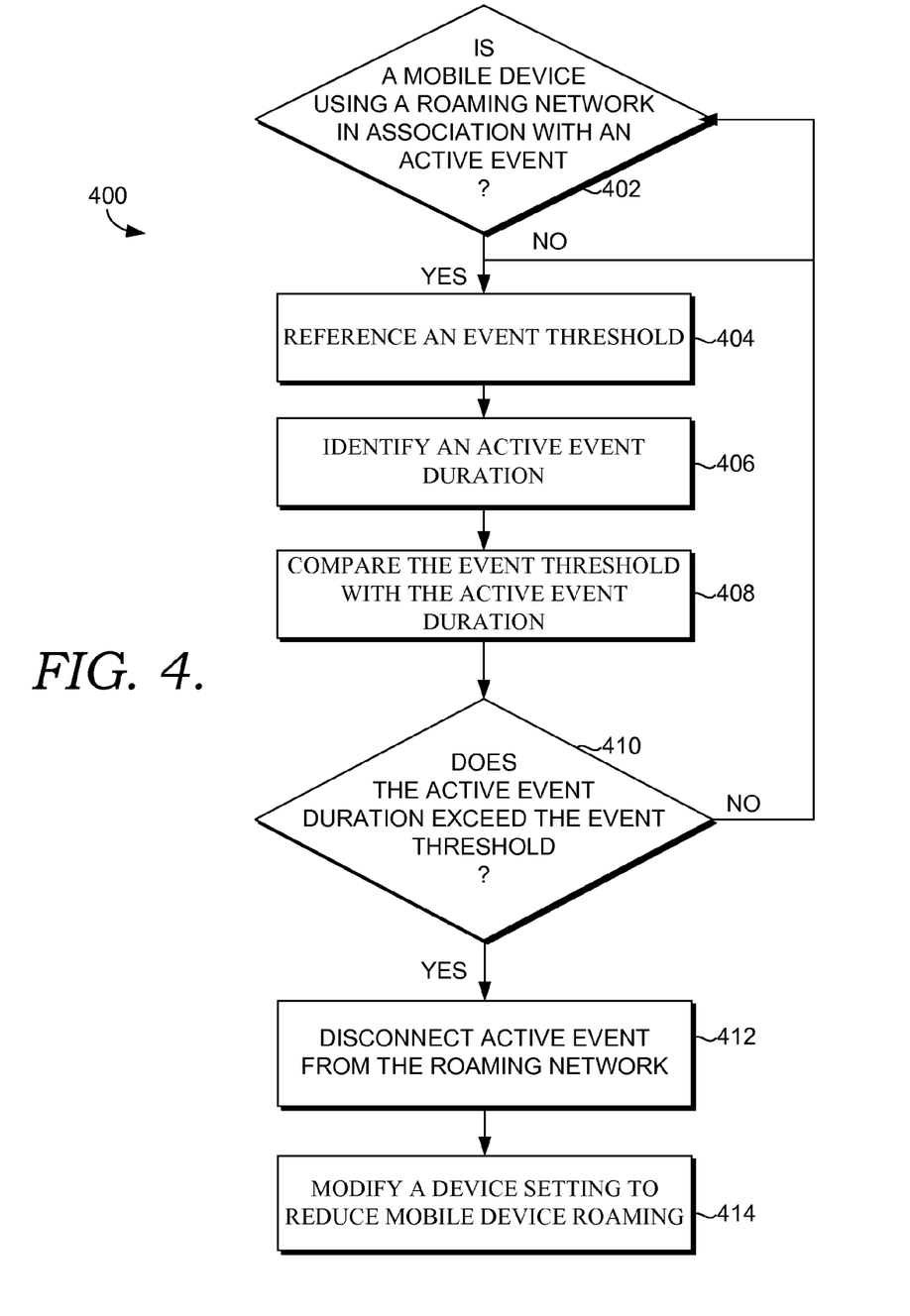
FIG. 4 is a flow diagram illustrating an exemplary method for controlling roaming of a mobile device associated with monitoring duration of an active event, in accordance with an embodiment of the present invention.

Now turning to FIG. 4, an exemplary method 400 for controlling roaming of a mobile device associated with monitoring duration of an active event is illustrated, in accordance with an embodiment of the present invention. Initially, as indicated at step 402, it is determined whether the mobile device is using a roaming network in association with an active event. In embodiments, the mobile device, or other computing device, might identify a network being used by the mobile device and/or identify an operation mode (i.e., active mode or idle mode) of the mobile device. If it is determined that the mobile device is not using a roaming network in association with an active event, the method returns to step 402 until it is determined that the mobile device is using a roaming network in association with an active event. If, on the other hand, it is determined that the mobile device is using a roaming network in association with an active event, an event threshold is referenced at step 404. That is, the mobile device may reference (e.g., obtain, determine, identify, recognize, etc.) the maximum amount of time the mobile device is allowed to connect to one or more network other than the home network in association with one or more active events.

At step 406, an active event duration is identified. For example, a mobile phone might identify or determine an amount of time the roaming mobile phone has been used for a particular active event, such as a phone call. In embodiments, the mobile device times or measures an active event (e.g., a roaming phone call) to create an active event duration. Such an active event duration might be stored on the mobile device, on a server or other computing device associated with the home and/or roaming network.

At step 408, the event threshold is compared with the active event duration. Based on the comparison of the event threshold and the active event duration, it can be determined whether the active event duration exceeds the event threshold. This is indicated at step 410. If it is determined that the active event duration does not exceed the event threshold, the method returns to step 402 to determine if the mobile device is using a roaming network in association with an active event. Accordingly, in instances that the active event duration does not exceed the event threshold, the mobile device remains connected to the roaming network until the event threshold is surpassed. As can be appreciated, the method might return to step 402 upon determining the active event duration does not exceed the event threshold, upon a lapse of a time period after such a determination, or upon an occurrence of an event, time, or time period. If, however, it is determined that the active event duration does exceed the event threshold, at step 412, the active event is disconnected from the roaming network. That is, the mobile device might terminate the roaming call and disconnect from the roaming network.

At step 414, a device setting of the mobile device is modified to reduce mobile device roaming. As such, the mobile device can be transferred to the home network to receive services from the home network. In one embodiment, changing the device setting of the mobile device involves changing the device setting on a device on a roam only setting or an automatic setting to the home network only setting, wherein the mobile device is required to search for the home network. In further embodiments, the device setting of a device on roam only setting could be modified to an automatic setting. In still further embodiments, a mobile device whose setting was initially changed to a home network only setting after exceeding the event threshold, might change its device setting to an automatic setting where the home network is unavailable.

Figure 5:
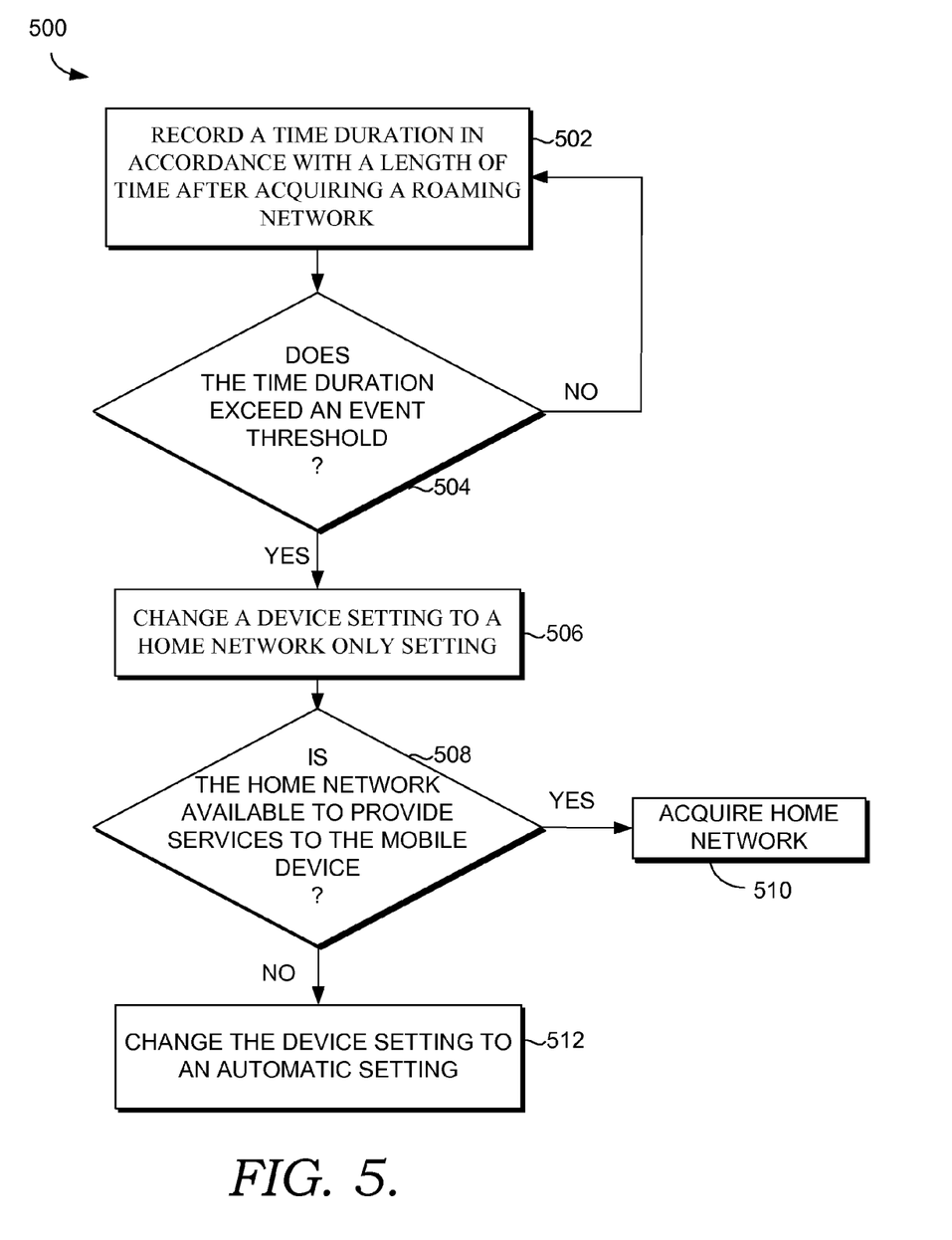
FIG. 5 is a flow diagram illustrating an exemplary method for controlling roaming of a mobile device.

With reference to FIG. 5, in accordance with an embodiment of the present invention, an exemplary method 500 for controlling roaming of a mobile device is illustrated. Initially, as indicated at step 502, a mobile device records a time duration in accordance with a length of time after initially acquiring or connecting to a roaming network. Subsequently, at step 504, it is determined if the time duration in association with the mobile device connected to the roaming network exceeds an event threshold indicating a maximum time that the mobile device is allowed to roam. If it is determined that the time duration does not exceed the event threshold, the method returns to step 502. If, on the other hand, it is determined that the time duration does exceed the event threshold, at step 506, a device setting of the mobile phone is changed to a home network only setting. Such a modification to the device setting removes the mobile device from the roaming network. At step 508, it is determined if the home network is available to provide services to the mobile device. If the home network is available to provide services, the home network is acquired, as indicated at step 510. If, however, the home network is not available to provide services to the mobile device, the device setting is changed to an automatic setting to allow the mobile device to acquire an available roaming network. This is indicated at step 512.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for controlling roaming of a mobile device when the mobile device is in an active mode while utilizing a roaming network, the method comprising:

referencing a time duration of an active event for which the mobile phone utilizes the roaming network;

determining that the time duration of the active event exceeds an event threshold that indicates a maximum amount of time the mobile device is allowed to connect to the roaming network in association with the active event; and in accordance with the determination that the time duration of the active event exceeds the event threshold, transferring the mobile device from the roaming network to a home network of the mobile device by modifying a device setting of the mobile device from a roam only setting or an automatic setting to a home network only setting such that the mobile device communicates via the home network, the home network only setting enabling access to the home network only, the roaming only setting enabling access to the roaming network only, and the automatic setting enabling the mobile device to search for the home network before searching for the roaming network.

2. The media of claim 1, wherein the active event comprises an active telephone call.

3. The media of claim 1, further comprising comparing the time duration of the active event to the event threshold.

4. The media of claim 1, wherein the mobile device is disconnected from the roaming network.

5. The media of claim 1 further comprising changing the device setting to an automatic setting if the home network is unavailable.

6. A computer-implemented system having a processor and memory for performing a method for controlling roaming of a mobile device when the mobile device is in an active mode while utilizing a roaming network, the system comprising:

a threshold determining component that determines that a time duration of an active event for which the mobile phone utilizes the roaming network exceeds an event threshold that indicates a maximum amount of time the mobile device is allowed to connect to the roaming network in association with the active event; and a network transferring component that initiates a transfer of the mobile device from the roaming network to a home network when the time duration of the active event for which the mobile phone utilizes the roaming network exceeds the event threshold associated with the active event, wherein the transfer of the mobile device includes modifying a device setting of the mobile device from a roam only setting or an automatic setting to a home network only setting such that the mobile device communicates via the home network, the home network only setting enabling access to the home network only, the roaming only setting enabling access to the roaming network only, and the automatic setting enabling the mobile device to search for the home network before searching for the roaming network.

7. The system of claim 6, wherein the active event comprises an active phone call.

8. The system of claim 7, wherein the network transferring component disconnects the active event if the active event duration exceeds the event threshold.

9. The system of claim 6, wherein the device setting of the mobile device is identified.

10. The system of claim 6, further comprising changing the device setting to an automatic setting if the home network is unavailable.

11. The system of claim 6, wherein the time duration of the active event is monitored to create the active event duration.

12. A computer-implemented method for controlling roaming of a mobile device when the mobile device is in an active mode while utilizing a roaming network, the method comprising:

monitoring an active phone call utilizing the roaming network to obtain a current time duration of the active phone call;

referencing an event threshold associated with the active phone call;

determining that the current time duration of the active phone call exceeds the event threshold; and in accordance with the determination that the current time duration of the active phone call exceeds the event threshold, disconnecting the active phone call from the roaming network and changing a device setting of the mobile device to connect the mobile device to a home network of the mobile device by changing the device setting of the mobile device from a roam only setting or an automatic setting to a home network only setting, the home network only setting enabling access to the home network only, the roaming only setting enabling access to the roaming network only, and the automatic setting enabling the mobile device to search for the home network before searching for the roaming network.

13. The method of claim 12 further comprising comparing the current time duration of the active phone call to the event threshold.

14. The method of claim 12 further comprising identifying the device setting of the mobile device, wherein the device setting for the mobile device comprises at least one of the roaming only setting, the home network only setting, and the automatic setting.

15. The method of claim 14 further comprising determining if the home network is available and, if not, changing the device setting to the automatic setting.

* * * * *